United States Patent [19]

Takada

[11] 4,225,154
[45] Sep. 30, 1980

[54] PASSIVE VEHICLE OCCUPANT RESTRAINT BELT SYSTEM

[75] Inventor: Juichiro Takada, Tokyo, Japan

[73] Assignee: Takata Koyjo Co., Ltd., Tokyo, Japan

[21] Appl. No.: 950,020

[22] Filed: Oct. 10, 1978

[30] Foreign Application Priority Data

Oct. 11, 1977 [JP] Japan ............................. 52-120963
Nov. 14, 1977 [JP] Japan ......................... 52-151633[U]
Nov. 14, 1977 [JP] Japan ......................... 52-151634[U]
Mar. 20, 1978 [JP] Japan ............................. 53-031094

[51] Int. Cl.² ............................................. B60R 21/10
[52] U.S. Cl. ..................................... 280/804; 297/469
[58] Field of Search ...................... 280/802, 803, 804; 297/469

[56] References Cited

U.S. PATENT DOCUMENTS 3,882,955  5/1975  Kaneko ............................. 280/803

FOREIGN PATENT DOCUMENTS

2245802  4/1973  Fed. Rep. of Germany ............ 280/803
2161384  6/1973  Fed. Rep. of Germany ............ 280/804
2458549  6/1976  Fed. Rep. of Germany ............ 280/804

Primary Examiner—John P. Silverstrim
Attorney, Agent, or Firm—Brumbaugh, Graves, Donohue & Raymond

[57] ABSTRACT

The belt or belts of a passive vehicle occupant restraint belt system are moved from a restraining to a releasing position by a motion transmission system which transmits opening motion of a vehicle door to a belt transfer guide and includes a motion amplifier, the output of which drives the guide, and a folding linkage which remains folded and transmits door motion to the motion amplifier input device when the door moves between the closed position and a partly open position and unfolds and substantially ceases to transmit door motion to the motion amplifier when the door is moved between partly and fully open positions.

17 Claims, 14 Drawing Figures

PASSIVE VEHICLE OCCUPANT RESTRAINT BELT SYSTEM

BACKGROUND OF THE INVENTION

This invention relates to a passive vehicle occupant restraint belt system in which the belt is automatically, easily and effectively transferred between an occupant-restraining and an occupant-releasing configuration in response to opening and closing movements of a vehicle door and, in particular, is transferred substantially fully to the releasing configuration when the door is opened only partway toward the fully open position.

In recent years there have been many proposals for passive occupant restraint systems for vehicles. The most common type of restraint systems are those based on restraint belts, and most of the proposed belt systems include a belt transfer mechanism which is driven by an electric motor or a mechanical lever or gear transmission. Many of the proposed systems, particularly those which use a mechanical drive to transfer the belt, require that the vehicle door be fully open to attain full release of the belt.

There are, of course, occasions when the vehicle door can be opened only partway, such as when the vehicle is parked alongside another vehicle or some other obstruction. This fact has apparently led to reliance on electric motor-driven systems, inasmuch as operation of the motor can be controlled in various ways that are unaffected by door position. In contrast, mechanical systems which transmit movement of the door into movement of a belt transfer device have, as heretofore proposed, involved a direct relationship between the amount of transfer of the belt and the amount of door motion; accordingly, a half open door produces a half released belt with such a device. The development of a good mechanical type transfer device has also been hampered by the fact that there is comparatively litte relative movement between adjacent door and door frame parts in the usual side-hinged vehicle door, while almost all passive restraint belt configurations require large movements of a belt transfer device.

SUMMARY OF THE INVENTION

There is provided, in accordance with the present invention, a passive vehicle occupant restraint belt system which includes apparatus for moving a restraint belt from an occupant-restraining to an occupant-releasing position in response to partial opening of the vehicle door. The apparatus transfers the belt by transmitting and amplifying the opening motion of the door to a transfer device, such as a wire, a racked wire or a tape connected to a transfer guide which engages the belt.

In particular, an apparatus, according to the invention, comprises a belt transfer device engaging the belt and arranged to move the belt from the restraining to the releasing position and a motion transmitting device coupled to the belt transfer device for transmitting and amplifying the opening motion of the door to the transfer device. The transmission device includes a motion amplifier mounted on either the vehicle body or the door and a folding linkage having one end attached to the door when the amplifier is mounted on the body, or the body when the amplifier is mounted on the door. The other end of the folding linkage is coupled to an input component of the motion amplifier. The linkage is controlled to maintain it in substantially the folded state during movement of the door from the closed to a partly open position, thus to transmit the door movement to the motion amplifier. The linkage control mechanism causes the linkage to unfold during movement of the door from the partly open to the fully open position so that the transmission of door movement of the motion amplifier is substantially halted when the door is part way open. Accordingly, the belt is moved substantially completely from the restraining to the releasing position during movement of the door from the closed to the partly open position. As soon as the door is partly open, it can be fully opened without imparting any substantial additional movement to the transfer device.

In a preferred embodiment the motion amplifier includes a gear train having an input pinion, and the linkage includes first and second links which partly overlap adjacent the ends thereof remote from the ends of the linkage which are coupled to the amplifier and to the vehicle body or door, such an overlapping occurring, however, only when the linkage is in its folded condition. The overlapping ends of the links are joined by a connecting link which is connected to the first link for articulation by a first pin and to the second link for articulation by a second pin. The second link has a rack gear which meshes with the amplifier pinion.

The linkage control includes a guide for guiding the second pin along a path which lies in a plane substantially perpendicular the axis of rotation of the amplifier pinion so that the rack gear tracks the pinion and a guide for guiding the first pin along the path which includes at least two parts, as follows: a first part that is substantially parallel to the path of the second pin such that the linkage remains essentially folded as the first pin transverses such first part; and a second part which is curved such that as the first pin moves through it, the linkage unfolds and the second link remains substantially stationary, relative to the amplifier pinion.

The connecting link may include a lever portion adjacent to the second pin which is engageable with an abutment as the door nears the partly open position in moving from the closed position, In this case the guide for the first pin includes a transition part between the aforementioned first and second parts which is arranged to cause the linkage to begin to unfold while the second link continues to move and drive the pinion. Motion is transmitted with a leveraged force supplied by the action of the lever part of the connection link which is brought into engagement with the abutment when the linkage partly unfolds.

The motion amplifier preferably includes a large gear concentric to and rotatable with the input pinion, a second pinion meshing with and driven by the large gear and an output gear or roll concentric to and rotatable with the second pinion, the type of output element depending upon what driving element is used in the transfer device. For example, a racked wire transfer device will be driven by an output gear, while a wire driving element will be driven by a reel. Examples of the output element and the transfer device are described in greater detail below in connection with the accompanying drawings.

It is desirable to include a spiral torsion spring in association with the motion amplifier for storing energy when the door is closed and returning stored energy when the door is opened, thereby to assist in driving the transfer device. The same amplifier can be used to drive two transfer devices, for example, a racked wire which is received within a guide rail and installed in the vehicle roof and a second racked wire received in a guide rail installed in the vehicle door, each of the racked wires having a belt guide which moves along the rail and transfers a portion of one or more occupant restraint belts of the belt system.

For a better understanding of the invention reference may be made to the following description of exemplary embodiment, taken in conjunction with the figures of the accompanying drawings.

DETAILED DESCRIPTION OF EXEMPLARY EMBODIMENTS

Figure 1:
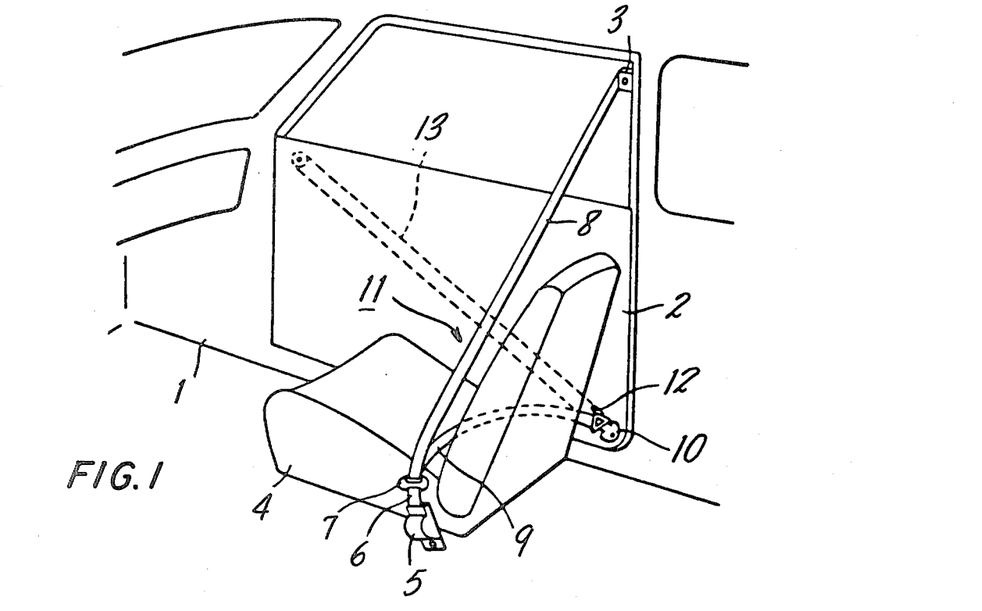
FIG. 1 is a pictorial view in schematic form of one embodiment of a complete restraint belt system showing the belt in the occupant-restraining position.
Figure 2:
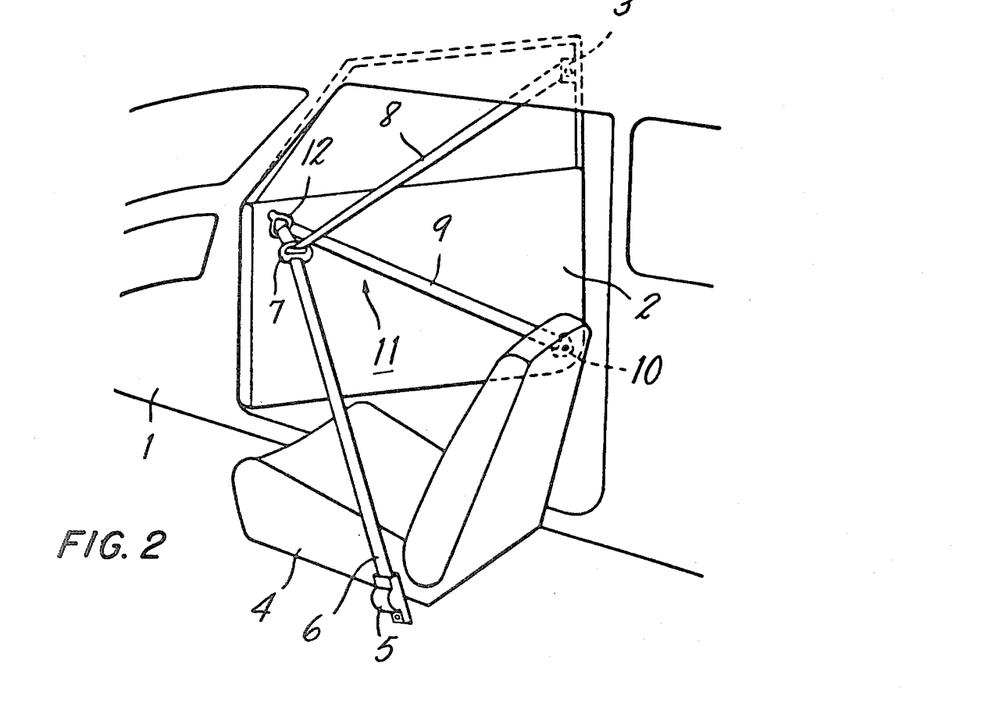
FIG. 2 is a pictorial view of the system shown in FIG. 1, but illustrating it with the belt in the occupant-releasing position.

The restraint belt system shown in FIGS. 1 and 2 of the drawings is associated with a door 2 that is hinged along its front end to the vehicle body 1 and employs a single continuous restraint belt 11. The belt 11 is anchored at one end to an anchor 3 mounted at the upper rear corner of the door, leads from the anchor through a ring 7, and passes from the ring 7 through a transfer guide 12 from which it leads to an anchor 10 at the rear lower corner of the door 2. The ring 7 subdivides the continuous belt 11 into a shoulder belt portion 8 and a lap belt portion 9 for restraining the occupant when the belt is held in the restraining position shown in FIG. 1, which position is maintained by a control belt 6 connected between the ring 7 and an emergency locking retractor 5. As is described in more detail below, the transfer guide 12 is attached to a wire 13 which moves the guide 12 from the restraint position at the lower rear corner near the anchor 10 diagonally upwardly and forwardly to a releasing position near the upper front corner of the door panel below the window. In the releasing position of the guide 12 the shoulder portion 8 and lap portion 9 of the continuous belt 11 are both brought up close to the door where they are out of the way of a passenger entering or leaving the vehicle (See FIG. 2). The belt 11 is free to move through the ring 7, and the movement of the guide 12 to the position shown in FIG. 2 involves withdrawal of the control belt 6 from the locking retractor 5.

The transfer of the restraint belt 11 from the occupant-restraining position shown in FIG. 1 to the release position shown in FIG. 2 takes place automatically when the door is opened partway. The degree to which the door is open when the belt system attains the occupant-releasing configuration can be selected with a view to providing reasonable convenience to the passenger in a situation when the door cannot be fully opened because of an adjacent obstruction, such as another vehicle parked alongside. Generally, a position approximately halfway between closed and fully opened is appropriate.

Figures 3, 4:
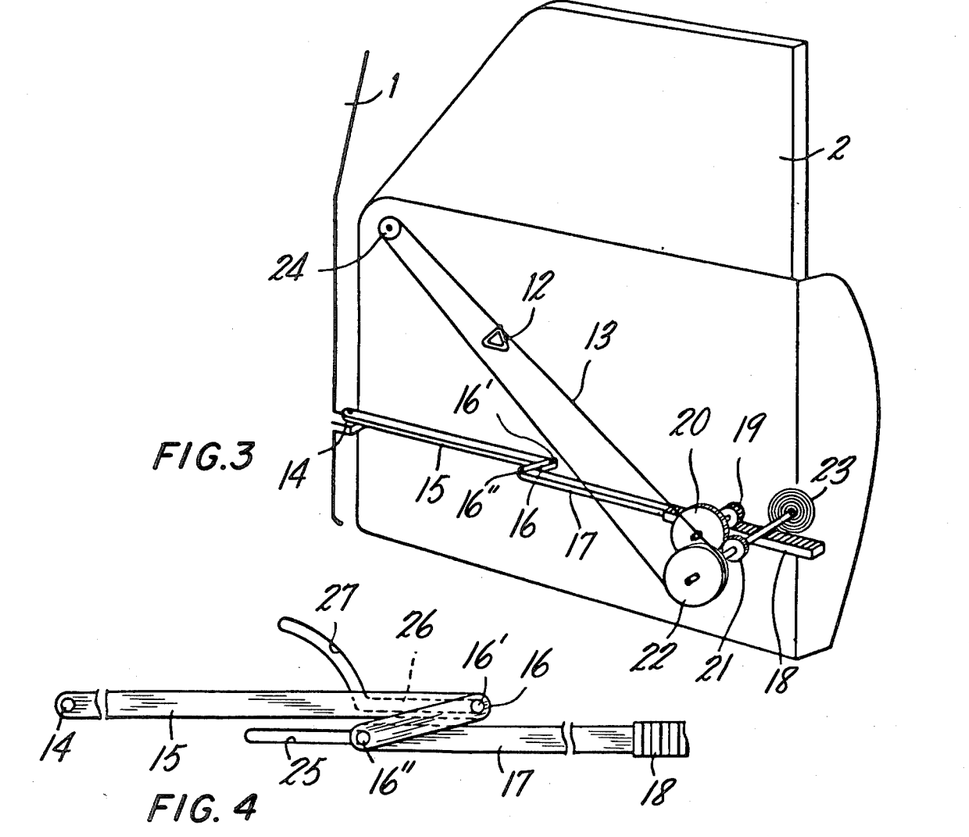
FIG. 3 is a pictorial, schematic illustration of one form of belt transfer device and a motion amplifier suitable for use with various belt systems, such as the one shown in FIGS. 1 and 2.
FIG. 4 is a schematic diagram of a folding linkage associated with the motion amplifier, the linkage being shown in the folded position which exists with the door closed.

FIG. 3 illustrates an embodiment of an apparatus, according to the present invention, for moving the occupant restraint belt between the restraining and releasing positions, the embodiment of FIG. 3 being suitable for use in connection with the belt system shown in FIGS. 1 and 2 as well as other belt systems. The apparatus of FIG. 3 consists of three basic sub-systems, namely, a folding linkage, a motion amplifier and a belt transfer device. In the embodiment shown in FIG. 3 the apparatus is mounted in the door, but the invention also contemplates mounting the apparatus in the vehicle body. Although not shown in the drawing, the major part of the linkage and the motion amplifier are enclosed in a suitable housing and may be made as a self-contained assembly that is easily installed in the door during manufacture of the vehicle.

The linkage consists of a first link 15 having one end attached by a coupling 14 to the door frame of the body 1, the coupling being of a type which permits the link to pivot when the door is open and permits the link to articulate in operation in the manner which is described in more detail below. The other end of the link is coupled by a first pin 16' to one end of a short connecting link 16. The other end of the connecting link is connected by a second pin 16" to one end of a second link 17, the other end of which carries a rack gear 18.

The amplifier mechanism comprises an input pinion 19 which meshes with and is driven by the rack gear 18, a large gear 20 concentric to and rotatable with the pinion 19, a second pinion 21 which meshes with and is driven by the large gear 20, and an output element which, in the embodiment shown in FIG. 3 is a wire reel 22. A spiral spring 23 is coupled to the shaft of the pinion 21 and is so arranged as to store energy when the door is moved from partway open to closed and deliver energy when the door is moved from closed to partway open, thereby to assist in transferring the belt from the restraining to the releasing position.

The belt transfer device of FIG. 3 comprises a wire 13 driven by the wire reel 22 and carrying a transfer guide 12 through which the belt passes freely, as is described above (see also FIGS. 1 and 2). One end of the wire 13 is secured to the reel, and a sufficient number of turns are made around the reel to permit the wire to be unwound from the reel to allow transfer of the guide 12 from a position near the anchor 10 to a position near the upper front of the door (see FIG. 2). The wire 13 then leads around an idler roll 24 and returns back to the wire reel 22 where the return end is secured. The reel 22 preferably includes two grooves, each of which allows a length of wire to be wound and unwound when the reel is rotated. Accordingly, when the transfer guide 12 is in the lower rearward position, counterclockwise rotation of the reel results in winding up of the lower return segment of the wire on the reel and unwinding of the upper transfer segment. Similarly, return of the guide from the upper front to the lower rear end of the door is produced by clockwise motion of the reel which, in turn, produces rewinding of the transfer segment and unwinding of the return segment.

The motion amplifier multiplies the small movement, relative to and lengthwise of the door, of the link 17 of the linkage that occurs during movement of the door from the closed to the partly open position into the desired, much greater movement of the transfer guide along the door. As is well-known to those skilled in the art, the amount of amplification of the motion of the link 17 is a matter of ratios of the gears and the diameter of the output reel 22. For example, if the rod 17 moves 30 mm relative to the pinion 19 when the door is opened and if it is desired to move the belt guide 12 600 mm, the overall gear ratio (input to output) of the amplifier should be 1 to 20.

Figure 5:
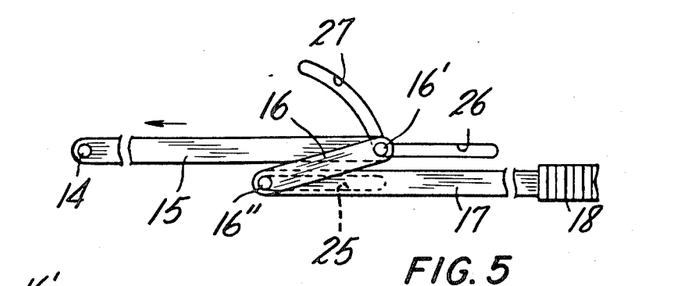
FIG. 5 is a diagram of the linkage of FIG. 4 showing it at the end of the motion transfer when the door is partly open.
Figure 6:
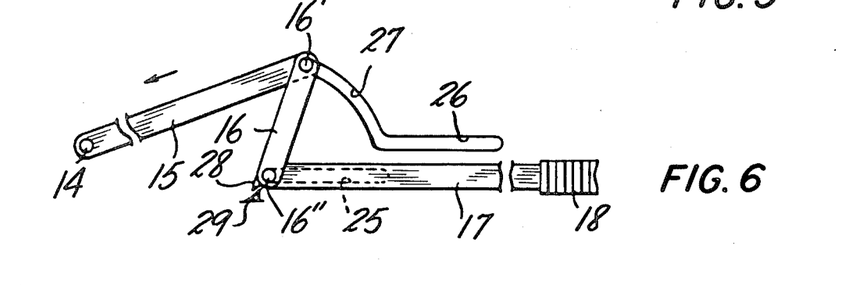
FIG. 6 is a diagram of a linkage of FIGS. 4 and 5 showing it at the fully open position of the door.

FIGS. 4-6 of the drawings show the linkage in greater detail, particularly the control components which govern the operation of the linkage in transmitting motion to the motion amplifier during the time that the door is moving between closed and partly open positions and in ceasing to transmit motion when the door is moved between the partly open and fully open positions.

The control components of the linkage system maintain the linkage in substantially the folded position (FIG. 4) during movements of the door between closed and partly open. In the embodiment shown in FIG. 4, this is accomplished by a guideway 25 for the pin 16" which controls the relative movement of the link 17 so that it moves, relative to the door, along a path lying generally in a plane perpendicular to the axis of rotation of the pinion 19, thus to ensure that the rack gear 18 tracks the pinion 19. Meanwhile, the link 15, is constrained from articulating relative to the link 17 by the straight portion 26 of a guideway associated with the pin 16'. The lengths of the guideways 25 and 26 are such as to retain the linkage in folded condition through the range of movement of the door between the closed (FIG. 4) and, partly (FIG. 5) positions. In the course of door movement between closed and partly open, the door moves longitudinally relative to the linkage, the linkage being essentially stationary axially by virtue of being coupled by the coupling 14 to the door frame. The movement of the door in the axial direction and relative to the gear rack 18 on the link 17 drives the pinion 19 which in turn drives the remaining parts of the gear train and transmits motion via the output reel 22 to the transfer wire.

When the door has reached the partly open position, the condition illustrated in FIG. 5, the control device associated with the linkage initiates a lost motion phase of operation of the linkage in which the linkage unfolds, the link 17 remaining stationary relative to the door and thus ceasing to impart rotation to the pinion 19 while the connecting link 16 articulates relative to the links 17 and 15. In particular, the control includes a curved guideway 27 which leads from the guideway 26 and guides the pin 16' along a path which allows the door to be moved between the partly open and fully open position without movement of the second link 17, relative to the door. This means, of course, that the guide groove 27 is designed such that the axis of the pin 16" remains stationary relative to the door and that the links 16 and 15 articulate relative to the link 17 and to each other to accommodate the relative movement between the axis of the coupling 14 and the axis of the pin 16" as the door is moved between partly open and fully open positions. FIG. 6 shows the configuration of the linkage when the door is fully open.

It will be recalled from the foregoing description that the restraint belt 11 is held under tension by the control belt 6. Accordingly, the transfer guide 12 is under a force which tends to move it from the front toward the rear of the door. That force is transmitted back through the motion amplifier and to the link 17 and represents a force tending to pull the link 17 to the right (as shown in FIGS. 4-6). A lug on the link 16 engages a pawl 29 when the door is at or near the fully open position and prevents the link 17 from being pulled to the right. This arrangement ensures that reverse motion of the link 17 will not occur until the door is moved some distance from the fully open towards the closed position, whereupon the lug 28 is disengaged from the pawl. Thereafter, the linkage operates in the reverse of the operating sequence described above.

Briefly, then, the operation of the apparatus shown in FIGS. 3-6 in connection with the belt system shown in FIGS. 1 and 2 is as follows. Beginning with the door fully closed (FIGS. 1 and 4) the linkage (15, 16 and 17) resides in the folded condition, and the transfer guide 12 resides in a position close to the anchor 10 at the lower rear of the door 2. The retractor 5 on the control belt 6 holds the lap belt portion 9 and shoulder belt portion 8 of the belt 11 in the restraining position in engagement with an occupant (if an occupant is in the vehicle at the time). When the door is opened, the control guideways 25 and 26 hold the linkage in folded condition (FIGS. 4 and 5) throughout the time that the door is being moved from a closed to a partly open position. Thus, the door (which is, of course, hinged to pivot on an axis some distance outboard from the coupling 14) moves relative to the linkage and carries the motion amplifier with it. Relative movement between the motion amplifier and the link 17 causes the rack gear 18 to drive the pinion 19 which, in turn, drives the wire 13 in a direction to move the guide 12 upwardly and forwardly toward the upper front corner of the door panel. Full movement of the transfer guide 12 to the release position (FIG. 2) is completed when the door reaches a partly open position (see also FIG. 5). If the door is pushed farther toward the fully open position, the linkage unfolds under the control of the guideway 27 while the link 17 and gear rack 18 remain stationary relative to the door. Movement of the transfer guide 12 to the upper front corner of the inner door panel brings the restraint belt into the releasing position (FIG. 2) and results in the condition of the linkage depicted in FIG. 6.

When the door is moved from open to closed position the linkage refolds to the position of FIG. 5 without any effect on the belt system. Beginning when the door reaches the partly open position, movement of the door toward the closed position produces relative movement between the door and the linkage 17, which is held in the folded condition by the parallel guideways 25 and 26. Such relative movement drives the motion amplifier in the reverse direction which, in turn, drives the wire and moves the guide 12 back to the lower rear corner of the door, the occupant-restraining position. Meanwhile the control belt 6 pulls the restraint belt 11 into the occupant-restraining position.

FIGS. 7 to 11 show some additional embodiments of the apparatus, according to the invention, which include many of the features of the embodiment described above but also include certain modifications. In all cases the same reference numerals are applied to elements of the embodiments of FIGS. 7 to 11 which are essentially the same as the elements of the embodiment of FIGS. 1 through 6, and the following description of the embodiments of FIGS. 7 to 11 may be considered in conjunction with the foregoing description insofar as similar elements and functions are involved.

Figure 7:
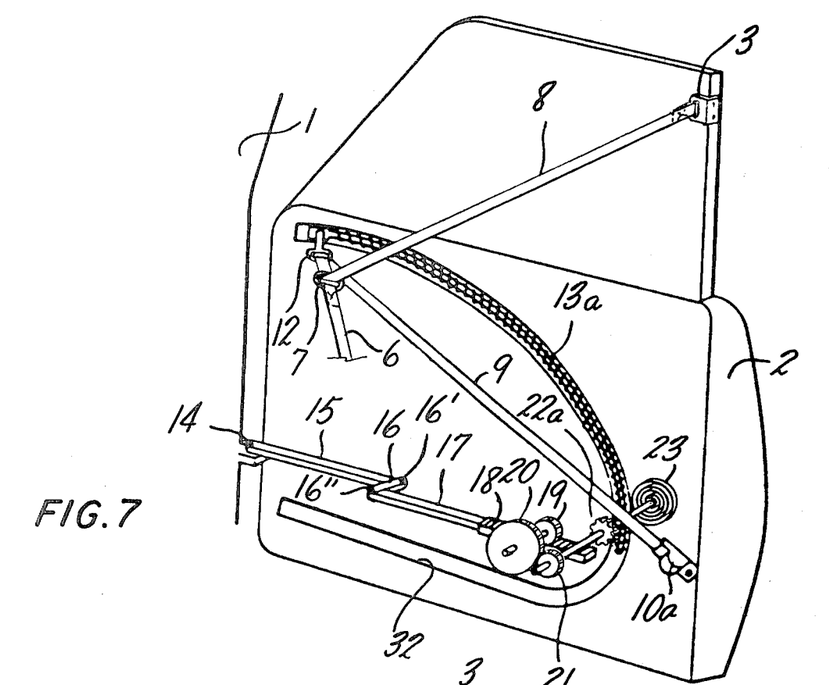
FIG. 7 is a pictorial view in schematic form of another motion amplifier and transfer apparatus embodying the present invention.

The belt system shown in FIG. 7 is essentially the same as that of FIGS. 1 through 3. The principal difference resides in the substitution of a racked wire 13a for the wire of the transfer device. The racked wire 13a is driven by an output gear 22a of the motion amplifier and is received in a guide rail which constrains it to move along a predetermined path which includes not only the path of movement of the transfer guide 12 but a path along the lower part of the door into which the racked wire is driven and in which it resides when the transfer guide 12 is in the lower rear corner of the door. Upon opening and closing movements of the door between fully closed and partly open positions, the racked wire is driven by the motion amplifier and pushes the guide 12 to the upper front of the inner door panel and pulls the guide back down to the lower rear portion of the door. This embodiment has a retractor 10a instead of an anchor for the restraint belt.

Figure 8:
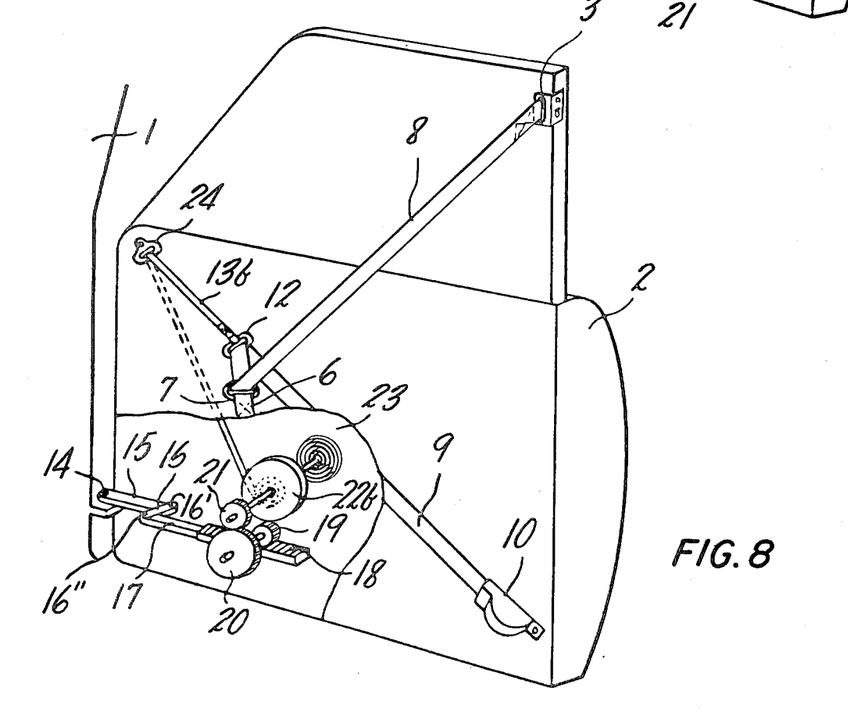
FIG. 8 is a pictorial view in schematic form of a restraint system which is generally similar to that of FIG. 7 except that the belt transfer device and the output of the motion amplifier are modified.

The restraint belt system shown in FIG. 8 also involves a different transfer device, namely, a tape 13a which is unwound from and wound onto a tape reel 22b, the output component of the motion amplifier. Unlike the systems of FIGS. 1 through 3 and 7, the embodiment shown in FIG. 8 functions only to pull the belt into the releasing position by winding the tape onto the reel, thus pulling the transfer guide 12 upwardly to a position close to a fixed tape guide 24 located at the upper front corner of the inner door panel. As in the other embodiments this motion occurs when the door is moved from a closed to a partly open position, from which point on the guide 12 remains stationary during movement of the door between the partly open and fully open positions. When the door is reclosed the tape 13b is unwound from the tape reel 22b, but no driving force is imparted to the tape. Instead the tension which is held in the control belt 6 by the retractor 5 (see FIGS. 1 and 2) pulls the restraint belt back into the restraining position.

Figure 9:
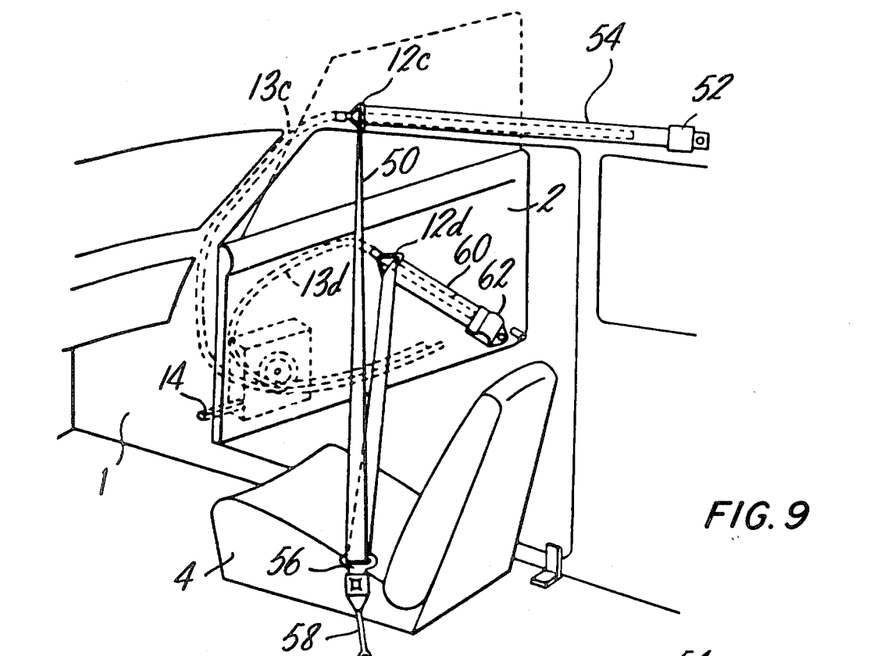
FIG. 9 is a pictorial view in schematic form of another embodiment of a restraint system shown in the occupant releasing configuration.
Figures 10, 11:
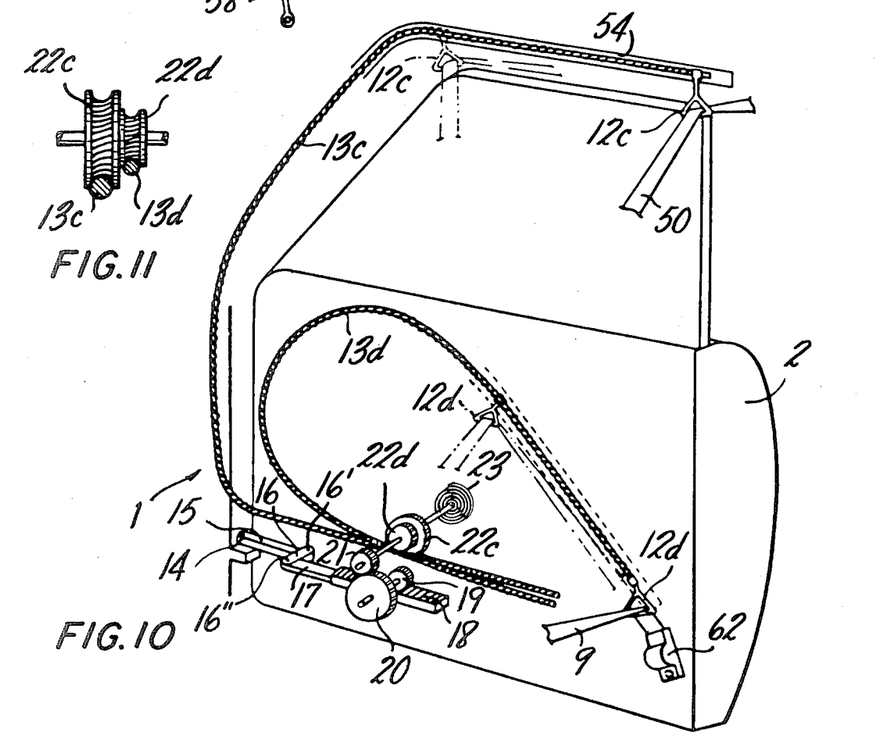
FIG. 10 is another pictorial, schematic drawing of the system of FIG. 9 in the occupant-restraining position and showing the motion amplifier and transfer device in greater detail.
FIG. 11 is a fragmentary side view of the output element of the motion amplifier shown in FIG. 10.

The embodiment shown in FIGS. 9 to 11 comprises a folding linkage and a motion amplifier which are generally the same as those shown in FIGS. 3 to 6 and described above. The modifications reside in a different arrangement of the restraint belt system and the provision of two belt transfer devices, each of which transfers a different portion of the belt.

The restraint belt 50 is anchored at one on an anchor 52 secured to on the vehicle body above and behind the seat 4. The belt 50 leads from the anchor 52 through a guide 12c which slides forward and backward along a track 54 installed in the vehicle roof above the door opening. The belt runs freely through the guide 12c and extends down and across the seat to and through a ring 56 which can be selectively affixed to and released from a buckle 58 attached to the seat (not shown) or (as shown) to the floor on the inboard side and at the rear of the seat. The belt 50 then leads from the ring 56 back across the seat through a second transfer guide 12d that moves up and down diagonally across the door in a track 60 and into an emergency locking retractor 62.

The embodiment of FIGS. 9 to 11 has two belt transfer devices, one for each of the transfer guides 12c and 12d. In particular, the output device of the motion amplifier consists of a gear 22c and a gear 22d, both of which are concentric to and driven by the second pinion 21 of the motion amplifier. The gears 22c and 22d are of different diameters to provide a different multiplier in conjunction with the respective racked wire 13c or 13d which each drives, the difference being present, of course, to provide for movement along a greater distance of the transfer guide 12c.

In the restraint position (solid lines in FIG. 10) the roof-mounted transfer guide 12c resides near the rearward end of the track 54 generally above and behind and occupant in the seat 4, thus to provide a shoulder belt portion which leads down and across the occupant's body to the ring 56, such position being established by retraction of the belt by the retractor 62. The door-mounted transfer guide 12d occupies the position near the retractor 62 at the lower rear corner of the door 2, thus providing a lap belt portion of the restraint belt 50 defined by the ring 56 and the transfer guide 12d.

When the door is moved from the closed to the partly open position the linkage and motion amplifier drive the racked wires 13c and 13d in a direction to move the guide 12d along the track 60 to an upwardly and forwardly located position on the door, relative to the retractor 62, the belt 50 being withdrawn from the retractor 62 in the process. Movement of the door between the partly open and fully open positions does not change the positioning of the belt; the belt remains in the occupant releasing configuration shown in FIG. 9, and allows a person to enter or leave the vehicle easily. When the door is moved from the partly open to the fully closed position, the transfer apparatus restores the belt system to the occupant restraining configuration (shown partly in solid lines in FIG. 10). The buckle 58 on the inboard side of the seat is ordinarily not used, but is available to permit the belt system to be released without opening the door should the need arise.

Figures 12, 13:
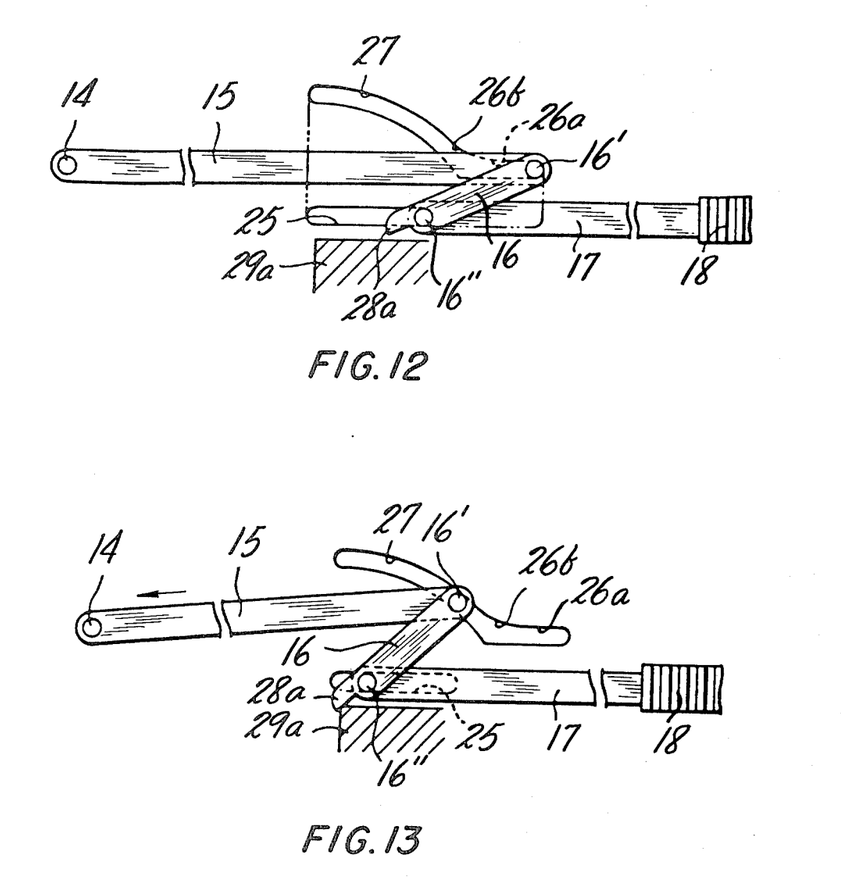
FIGS. 12, 13 and 14 are diagrams of a modified linkage for transmitting door motion to the input pinion of the motion amplifier, the figures showing the linkage in the positions with the door fully closed, partway open and fully open, respectively.
Figure 14:
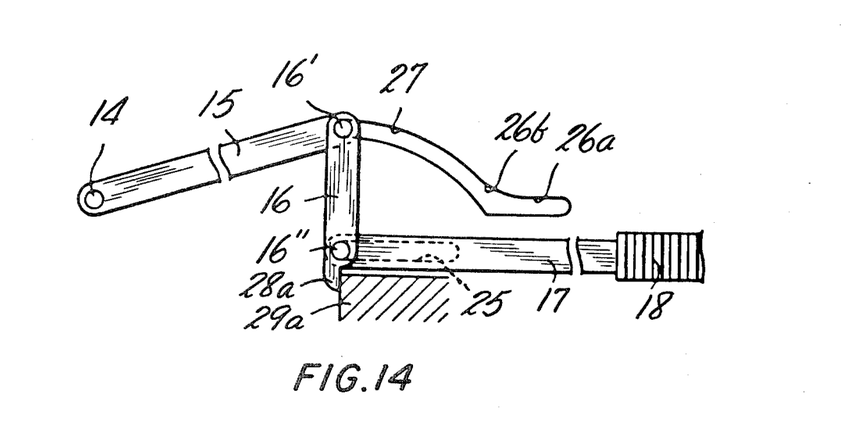

FIGS. 12 to 14 illustrate a linkage similar to the one shown in FIGS. 4 to 6 and described above but modified to reduce the force required to open the door. The modification involves, first of all, providing a small lever arm portion 28a on the connecting link 16 adjacent to pin 16" and an abutment 29a on the housing (not shown) located near the end of the guideway 25 remote from the rack gear 18. During part of the movement of the door between closed and partly open positions the linkage remains in the completely folded position shown in FIG. 12. Before the door reaches the partly open position, the linkage is partly unfolded by movement of the pin 16' into a transition region 26b where the second link 17 continues to move relative to the input pinion of the motion amplifier but also moves relative to the link 15. Movement of the pin 16' through the transition portion 26b of the guideway rotates the connecting link 16 sufficiently to bring the short lever 28a into engagement behind the abutment 29a.

At the point illustrated in FIG. 13, the transfer device has moved the guide to a position close to but not all the way to the full release position. As soon as the lever 28a engages and works against the abutment 29a, the force transmitted from link 17 to the link 15 via the connecting link 16 is greatly reduced by the lever action of the connecting link 16 turning about the abutment 29a, which constitutes a fulcrum for the lever action. The engagement between the lever portion 28a of the abutment 29a also prevents the link 17 from moving in the reverse direction.

Thus, there is provided in accordance with the present invention reliable, relatively simple apparatus for transferring a restraint belt system between an occupant-restraining and an occupant-releasing position. The apparatus is of compact size and can readily be mounted in the vehicle door without detracting from the appearance of the vehicle passenger compartment. The apparatus also provides the important advantage of moving the belt to the releasing configuration even though the door in only partly opened. Thus, when the vehicle is in a situation where the door can not be fully opened, the seat belt is nonetheless moved to the restraining position when the door is only partly open so a person can get into or leave the vehicle with ease.

The above-described embodiments of the invention are intended to be merely exemplary, and numerous variations and modifications can readily be made by those skilled in the art without departing from the spirit and scope of the invention. For example, the motion amplifier and transfer device can be mounted in the vehicle body, instead of in the door, in which case the link 15 will be connected by a coupling 14 secured to the door. This modification represents merely a reversal of parts in that the door and vehicle body are reversed relative to the linkage and motion amplifier. This and other variations and modifications that will be apparent to those skilled in the art are intended to be included within the scope of the invention as defined in the appended claims.

I claim:

1. In a passive occupant restraint belt system for vehicles which includes a restraining belt, apparatus for moving the belt from an occupant-restraining to occupant-releasing position in response to partial opening of a door of the vehicle comprising belt transfer means engaging the belt for moving the belt from the restraining to the releasing position and motion transmission means coupled to the belt transfer means for transmitting and amplifying opening motions of the door to the transfer means, the transmission means including (a) a motion amplifier mounted on one of the vehicle body and the door, (b) a folding linkage having one end attached to the other of the body and door and the other end coupled to an input component of the motion amplifier, and (c) means for controlling the linkage to maintain it in substantially its folded state during movement of the door from the closed to a partly open position, thus to transmit such door movement to the motion amplifier, and to cause the linkage to unfold during movement of the door from the partly open to the fully open position, and substantially to cease transmitting such door movement to the motion amplifier, whereby the bolt is moved substantially completely from the restraining to the releasing position, during movement of the door from the closed to the partly open position.

2. Apparatus according to claim 1 wherein (a) the motion amplifier includes a gear train having an input pinion, (b) the linkage includes first and second links which partly overlap adjacent the ends thereof remote from said one and other ends of the linkage when the linkage is in its folded condition and a connecting link connected for articulation by a first pin to the first link and a second pin to the second link, (c) the second link has a rack gear meshing with the amplifier pinion and (d) the linkage control means includes (i) guide means for guiding the second pin along a path which lies in a plane substantially perpendicular to the axis of rotation of the amplifier pinion so that the rack gear tracks the pinion and (ii) guide means for guiding the first pin along a path which includes a first part substantially parallel to the path of the second pin such that the linkage remains essentially folded as the first pin transverses such part and a second part which is curved such that as the first pin traverses the curved part, the linkage unfolds and the second link remains substantially stationary relative to the gear train pinion.

3. Apparatus according to claim 2 wherein (a) the connecting link includes a lever portion adjacent the second pin, (b) there is an abutment engageable by the lever portion as the door nears the partly open position in moving from the closed position, and (c) the guide for the first pin includes a transition part between the first and second parts shaped to cause the linkage to begin to unfold while the second link continues to move and drive the pinion but moves the pinion with a leveraged force applied by action of the lever part of the connecting link.

4. Apparatus according to claim 2 or claim 3 wherein the motion amplifier further includes a large gear concentric to and rotatable with the input pinion, a second pinion meshing with and driven by the large gear, and an output gear concentric to and rotatable with the second pinion, and wherein the transfer means includes a racked wire meshing with and driven by the output gear.

5. Apparatus according to claim 4 wherein the motion amplifier further includes a spiral torsion spring coupled to a gear of the motion amplifier and storing energy when the door is closed and releasing the energy when the door is opened to assist in driving the transfer means.

6. Apparatus according to claim 4 wherein the motion amplifier includes first and second output gears of different diameters concentric to and rotatable with the second pinion, and the belt transfer means includes a racked wire meshing with and driven by each of the output gears.

7. Apparatus according to claim 6 wherein the transfer means includes a guide rail installed in the vehicle roof and a guide rail installed in the vehicle door, each guide rail receiving one of the racked wires for movement therein, and wherein each racked wire carries a belt guide through which a portion of an occupant restraint belt passes and by which the belt is transferred upon movement of the guide with the racked wire.

8. Apparatus according to claim 2 or claim 3 wherein the motion amplifier further includes a large gear concentric to and rotatable with the input pinion, a second pinion meshing with and driven by the large gear and a reel concentric to and rotatable with the second pinion, and wherein the transfer means includes a flexible element having a portion which is wound onto and unwound from the reel in response to opening and closing movements of the door.

9. Apparatus according to claim 8 wherein the flexible element is a wire and wherein the wire leads from the reel, around an idler pulley and back to the reel and includes a second portion that is unwound from and wound onto the reel in response to opening and closing movements of the door.

10. Apparatus according to claim 8 wherein the flexible element is a tape and wherein the transfer means further includes retractor means coupled to the belt for transferring the belt from the releasing to the restraining position when the door is moved from partly open to closed and the tape is unwound from the reel.

11. Apparatus according to claim 8 wherein the motion amplifier further includes a spiral torsion spring coupled to a gear of the motion amplifier and storing energy when the door is closed and releasing the energy when the door is opened to assist in driving the transfer means.

12. Apparatus according to claim 2 and further comprising means for preventing the second link from moving in a direction corresponding to transfer of the belt from the releasing position toward the restraining position when the vehicle door is at or near the fully open position.

13. Apparatus according to claim 12 wherein said means for preventing the second link from moving includes a lug on the connecting link and a pawl engageable by the lug when the linkage is substantially unfolded.

14. Apparatus according to claim 12 or 13 wherein the belt transfer means includes a guide rail mounted in the passenger compartment, a guide movable along the rail and engaging the belt to transfer it along the rail, and a racked wire connected to the guide to move it along the rail, and wherein the motion amplifier includes an output gear meshing with and driving the racked wire.

15. Apparatus according to claim 1, 2 or 3 wherein the belt transfer means includes a guide rail mounted in the passenger compartment, a guide movable along the rail and engaging the belt to transfer it along the rail, and a racked wire connected to the guide to move it along the rail, and wherein the motion amplifier includes an output gear meshing with and driving the racked wire.

16. Apparatus according to claim 1, 2 or 3 wherein the belt transfer means includes a wire guided for movement along a path in the vehicle passenger compartment along which the belt is transferred, a belt guide fastened to the wire for movement with the wire along such path and engaging the belt to transfer it, and wherein the motion amplifier includes as its output a reel engaging and driving the wire.

17. Apparatus according to claim 1, 2 or 3 wherein the belt transfer means includes a tape having a belt guide at one end engaging the belt to transfer it and wherein the motion amplifier has as its output a tape reel onto which the other end of the belt is wound to move the guide and transfer the belt.

* * * * *

UNITED STATES PATENT AND TRADEMARK OFFICE
CERTIFICATE OF CORRECTION

PATENT NO. : 4,225,154
DATED : September 30, 1980
INVENTOR(S) : Juichiro Takada

It is certified that error appears in the above–identified patent and that said Letters Patent are hereby corrected as shown below:

Column 7, line 43, "13a" should be --13b--; column 8, line 29, "and" should be --an--; column 9, line 26, "in" should be --is--; lines 28 and 29, "restraining" should be --releasing--; and column 10, line 1, "bolt" should be --belt--.

Signed and Sealed this

Thirty-first Day of March 1981

[SEAL]

Attest:

RENE D. TEGTMEYER

Attesting Officer  Acting Commissioner of Patents and Trademarks